US011616670B2

(12) United States Patent
Cao et al.

(10) Patent No.: US 11,616,670 B2
(45) Date of Patent: Mar. 28, 2023

(54) MULTI-STRUCTURE REFERENCE SIGNALS (71) Applicant: ZTE Corporation, Guangdong (CN)

(72) Inventors: Wei Cao, Guangdong (CN); Zhifeng Yuan, Guangdong (CN); Li Tian, Guangdong (CN); Yifei Yuan, Guangdong (CN); Ziyang Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 97 days.

(21) Appl. No.: 17/165,114

(22) Filed: Feb. 2, 2021

(65) Prior Publication Data

US 2021/0160029 A1 May 27, 2021

Related U.S. Application Data (63) Continuation of application No. PCT/CN2018/098577, filed on Aug. 3, 2018.

(51) Int. Cl.
*H04L 27/26* (2006.01)
*H04L 5/00* (2006.01)
*H04W 74/08* (2009.01)

(52) U.S. Cl.
CPC ...... *H04L 27/26025* (2021.01); *H04L 5/0051* (2013.01); *H04L 27/2613* (2013.01); *H04W 74/0833* (2013.01)

(58) Field of Classification Search
None
See application file for complete search history.

(56) References Cited

U.S. PATENT DOCUMENTS

| 11,013,030 B2 | 5/2021 | Zhang et al. | |
| 2017/0201908 A1* | 7/2017 | Yan | H04L 41/08 |
| 2017/0245244 A1* | 8/2017 | Jung | H04W 72/02 |
| 2019/0081754 A1 | 3/2019 | Cheng et al. | |
| 2019/0229964 A1* | 7/2019 | Ouchi | H04W 92/18 |
| 2020/0187236 A1* | 6/2020 | Moon | H04L 1/1607 |

FOREIGN PATENT DOCUMENTS

| CN | 107370579 A | 11/2017 |
| CN | 107439047 | 12/2017 |
| EP | 3297239 A1 | 3/2018 |
| WO | 2017197973 A1 | 11/2017 |
| WO | 2017/209570 | 12/2017 |
| WO | 2018012424 A1 | 1/2018 |

OTHER PUBLICATIONS

International Search Report and Written Opinion in International Application No. PCT/CN2018/098577, dated Apr. 24, 2019, 7 pages.
Supplementary European Search Report in EP Patent Application No. 18928835.0, dated Jun. 15, 2021, 9 pages.
Notification to Complete Formalities of Registration for CN Application No. 201880096235.1, dated Apr. 22, 2022, 6 pages with unofficial translation.

\* cited by examiner

*Primary Examiner* — Diane L Lo
(74) *Attorney, Agent, or Firm* — Perkins Coie LLP

(57) ABSTRACT

A method of wireless communication includes generating, based on a mapping rule, at least two reference signals and transmitting, by a wireless communication device, the at least two reference signals using different symbols in a transmit time interval. Another method of wireless communication includes transmitting, to one or more wireless devices in a wireless network, information indicative of a mapping rule that specifies a mapping between at least two random access reference signal transmissions from the one or more wireless devices.

20 Claims, 10 Drawing Sheets

The first part, with pool size of $N_{p1}$

The second part, with pool size of $N_{p2}$

On the determined time-frequency resource, the UE randomly selects an option from $N_{p2}$ options.

A UE randomly selects an option from $N_{p1}$ options. The selected option index $I_{d1}$ determines the time-frequency resource of the second part.

MULTI-STRUCTURE REFERENCE SIGNALS

CROSS-REFERENCE TO RELATED APPLICATIONS

This application is a continuation of International Patent Application No. PCT/CN2018/098577, filed on Aug. 3, 2018, the contents of which are incorporated herein by reference in its entirety.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. For better bandwidth utilizations, techniques such as the use of multiple antennas for transmission and/or reception are also being used.

SUMMARY

This document describes technologies that can be embodied into user devices and network equipment in a wireless network. In one example aspect, user device embodiments may perform random access to the network using reference signals selected from a large pool based on a mapping rule that may be received from the network.

In one example aspect, a method of wireless communications includes generating, based on a mapping rule, at least two reference signals, and transmitting, by a wireless communication device, the at least two reference signals using different symbols in a transmit time interval.

In another example aspect, a method of wireless communications includes transmitting, to one or more wireless devices in a wireless network, information indicative of a mapping rule that specifies a mapping between at least two random access reference signal transmissions from the one or more wireless devices.

In yet another example aspect, a wireless communications apparatus comprising a memory, and a processor is disclosed. The memory is configured to store processor-executable code. The processor is configured to read the code and implement a method described herein.

In another example aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

With the development of Internet of Things (IoT), a large number of sensor nodes equipped with wireless communication module may be served by cellular networks. The IoT traffic tends to be sporadic and small data packages, which is quite different from legacy voice or data services.

A challenging topic in IoT communication is resource efficiency when supporting massive number of connections (1000s or greater). Since the IoT traffic tends to be sporadic and small data packages, signaling overhead to setup/release connections between UE (user equipment, e.g., sensor node aforementioned) and BS (base station) probably occupies even more resource than the data package to be transmitted. As a result, control channel becomes bottleneck in this situation. To avoid congestion in control channel, there are some possible ways to reduce control information to be exchanged.

One solution is resource pre-configuration, where physical resource (in time/frequency domain) for a specific UE is pre-allocated. However, it is impractical to pre-configure resource for all UEs in massive connection applications (e.g., devices to be supported per km2 in 5G mMTC, or massive machine-type communication scenario). First, a look-up-table of the pre-configuration is required in BS, which may be a heavy burden in BS storage. Secondly, update of pre-configuration would be very difficult, especially for moving UEs. BS may not be able to find suitable pre-configuration resource for a new comer. Third, the period of a pre-configured UE in massive connection applications would be too long to fulfill the latency requirements.

The other solution is grant-free transmission, where UE sends its package in an arrive-and-go manner. A (generally front-loaded) reference signal+data structure is a good candidate to carry necessary control information together with the real payload. The reference signal can be used for both UE detection and channel estimation. The UE identification can be inserted in the data part to identify the sender. The major problem in grant-free transmission is collision, especially in massive connection applications. Though carrier sensing or collision detection can be used to alleviate the problem, hidden nodes (i.e., UEs cannot hear each other due to distance or blocking) may still send their uplink message simultaneously. As a result, the BS receives the collided messages and may not be able to decode them successfully. We notice that near-far effect is a common phenomenon in grant-free transmission due to the lack of timely closed loop power control. If the near-far effect can be exploited in advanced receivers, it is possible to decode collided data packages with successive interference cancellation (SIC). To facilitate such interference cancellation processing, a collision detection mechanism is very desirable in reference signal design.

The techniques described in the present document may be used to solve the above-discussed problems, and others. In some embodiments, a multi-structure design of reference signal that can be used to detect collision in grant-free transmission is described.

Various embodiments may include: (1) more than one different reference signal structures are used in reference signal, (2) a random selected first reference signal may determine the time-frequency resource of the following reference signals, but the content of the following reference signals may be selected independently. For example, three different reference signal structures may be used. A UE randomly chooses an option in the first reference signal, then the time-frequency resource of the second and the third reference signals is determined. The content of the second and the third reference signals is randomly chosen by the UE in corresponding pools. (3) The random selected precedent reference signal determines the time-frequency resource of the following reference signals, but the content of the following reference signals are selected independently. For example, three different reference signal structures are used. A UE randomly chooses an option in the first reference signal, then the time-frequency resource of the second reference signal is determined. Next, the content of the second reference signal is randomly chosen by the UE in the second pool, which determines the time-frequency resource of the third reference signal. At last, the content of the third reference signal is randomly chosen by the UE in the third pool. The above-described relationship between the first and second reference signal may be controlled by a mapping rule. A UE may acquire the mapping rule either via a message received from the network or may have a mapping rule pre-programmed into the UE via another means (e.g., specified by an interoperability standard). While the present document uses examples of two reference signals, in general mapping rule that relates multiple reference signals with each other may be used. Furthermore, examples of 5G and LTE technologies are used for illustrative purposed only and the described techniques may be embodied in other wireless communication systems.

Taking two different structures combination as an example, the benefits of the proposed design include: (1) The overall random selection pool size is determined by multiplication of pool size 1 and pool size 2, where pool size 1 and pool size 2 correspond to the first reference signal and the second reference signal, respectively. The multiplication means an effective extension of pool, which significantly alleviates the collision. (2) The second reference signal provides collision detection capability with its degree of freedom. Without collision detection, the advanced receiver has to blindly try SIC on all reference signals, which means prohibitive complexity. With collision detection, the advanced receiver can carry out SIC on collided reference signals, which is more friendly to implementation.

Grant-free transmission, which originates from ALOHA scheme in Ethernet, is adopted in wireless communications with improvements. ALOHA allows UEs to transmit at will in the same frequency resource. When collision happens, each collided UE chooses a random delay for re-transmission. If UEs line up their start of transmission on a common time marker and use the same transmission duration (i.e., transmitting within time slots), the chance of collision can be reduced by half compared with ALOHA, this is known as Slotted ALOHA (S-ALOHA). For wireless communication systems with centric control, periodic downlink broadcast from BS enables UEs to synchronize their UL transmission to facilitate the usage of S-ALOHA. Theoretically, the maximum channel utilization for S-ALOHA is e-1, or about 37%. For IoT scenarios with massive connections (106 connections per km2), the efficiency and stability of S-ALOHA is questionable. To improve the resource efficiency based on S-ALOHA, various non-orthogonal multiple access (NOMA) schemes have been proposed to allow UEs to share the same time-frequency resource. However, the key point to guarantee NOMA reception performance is accurate channel estimation, which means collision avoidance/detection of reference signal is an important problem. Taking LTE RACH as an example, 64 preambles are provided per cell. If there are simultaneous UEs to access using randomly selected preambles, the collision probability increases rapidly with the number of simultaneous UEs. In IoT applications with massive connections, it would be very helpful to facilitate the usage of advanced receiver if there is a larger reference signal pool with collision detection capability.

In LTE systems, the random access signal is generated using Zadoff-Chu sequence of length 139 or 839. For a given cell, 64 different random access sequences are provided to all UEs. The corresponding root pool and cyclic shift pool is broadcast to all UEs. A UE randomly chooses a root and a cyclic shift to generate its random access signal. If more than one UEs choose the same root and cyclic shift, the BS cannot distinguish the collided random access signal from simultaneous UEs.

Figure 1:
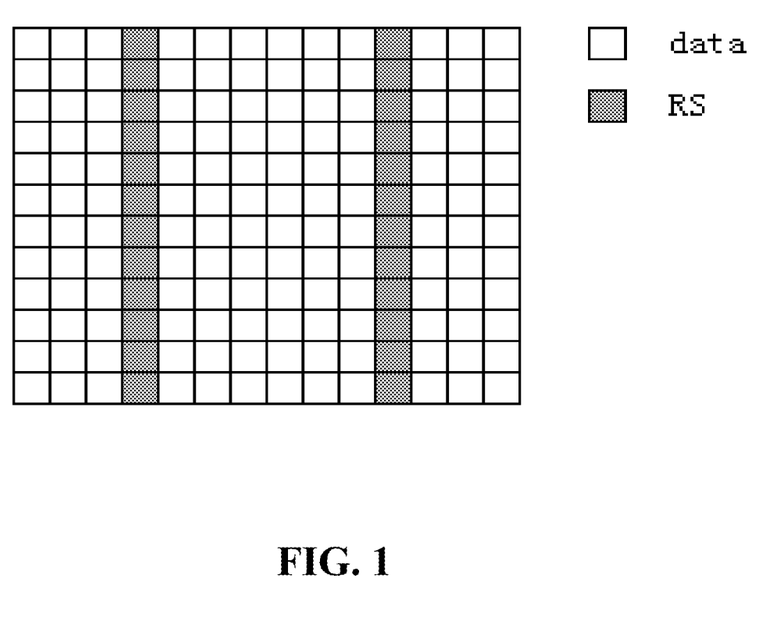
FIG. 1 shows an example of transmission resources used by an uplink signal.

In LTE systems, an uplink signal example is given in FIG. 1, which shows an OFDM transmission frame with symbols along the horizontal axis and subcarriers in a physical resource block (PRB) along the vertical axis. In the scheme depicted in FIG. 1, two reference signal (RS) symbols are used to facilitate channel estimation and physical impairment measurement. The reference signal is generated using given QPSK sequence (length<=36) or Zadoff-Chu sequence (length>36). The generation of 2 reference signal symbols follows the same method, e.g., both of them are Zadoff-Chu sequences. Different UEs use different parameters in reference signal generation. There is no reference signal collision among UEs, but the capacity of reference signal is very limited.

In 802.11a/g/n/ac systems, a common reference signal head (see L-STF and L-LTF in FIG. 2) is attached before following control and data part to enable UE detection and channel estimation. There are 10 short (identical) symbols and 2 long (identical) symbols in L-STF and L-LTF, respectively. All users use the same L-STF and L-LTF structures. If more than one UEs transmit simultaneously, the BS cannot resolve the collided packages, and those UEs have to randomly back-off and re-transmit.

In the embodiments described in the present document, a multi-structure reference signal design, where a combination of different structures is used for reference signal transmissions, is described. This combination may offer at least two advantages. One is to reduce collision probability by effectively expanding the reference signal pool size, the other is to provide collision detection capability on the receive side (e.g., base station, when UEs transmit the reference signals).

Figure 2:
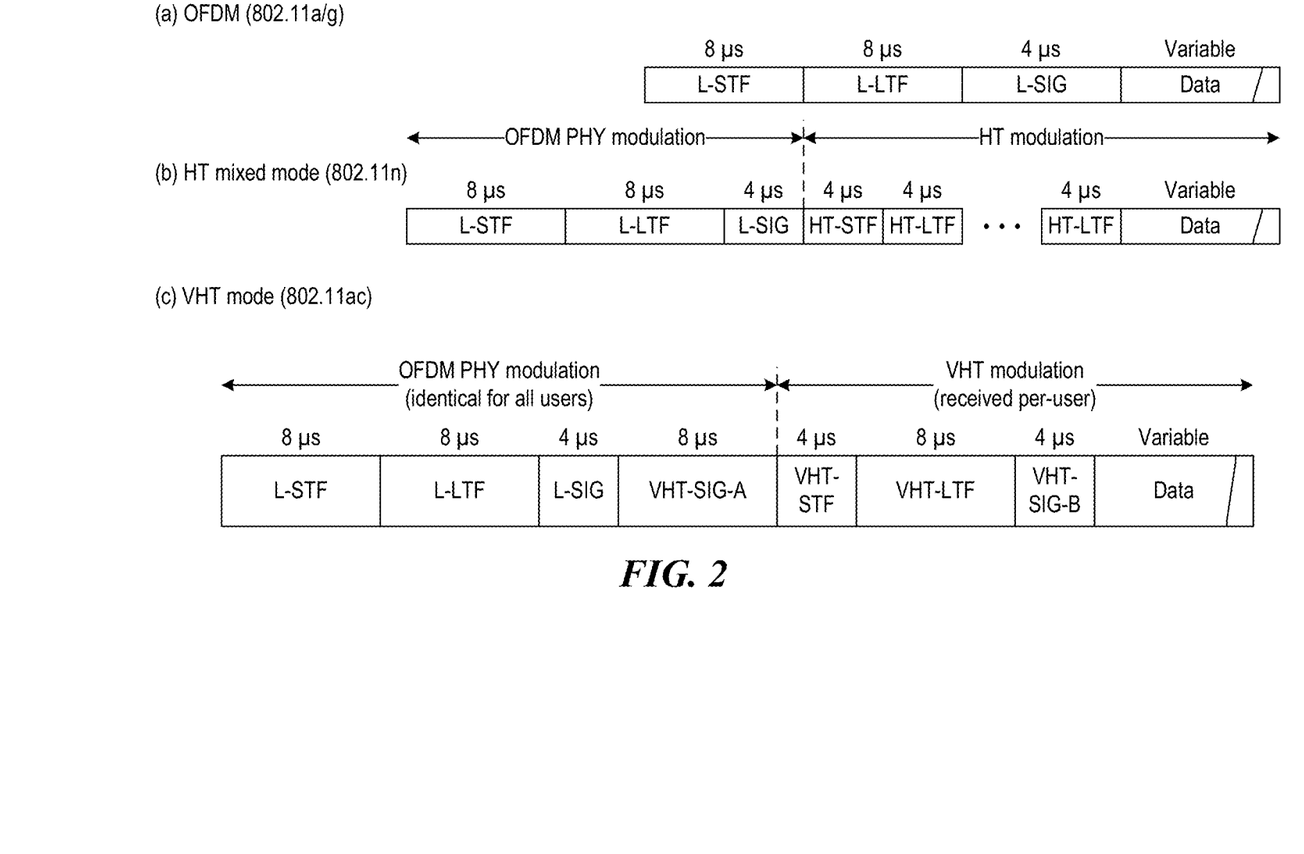
FIG. 2 shows an example transmission signal format.
Figure 3:
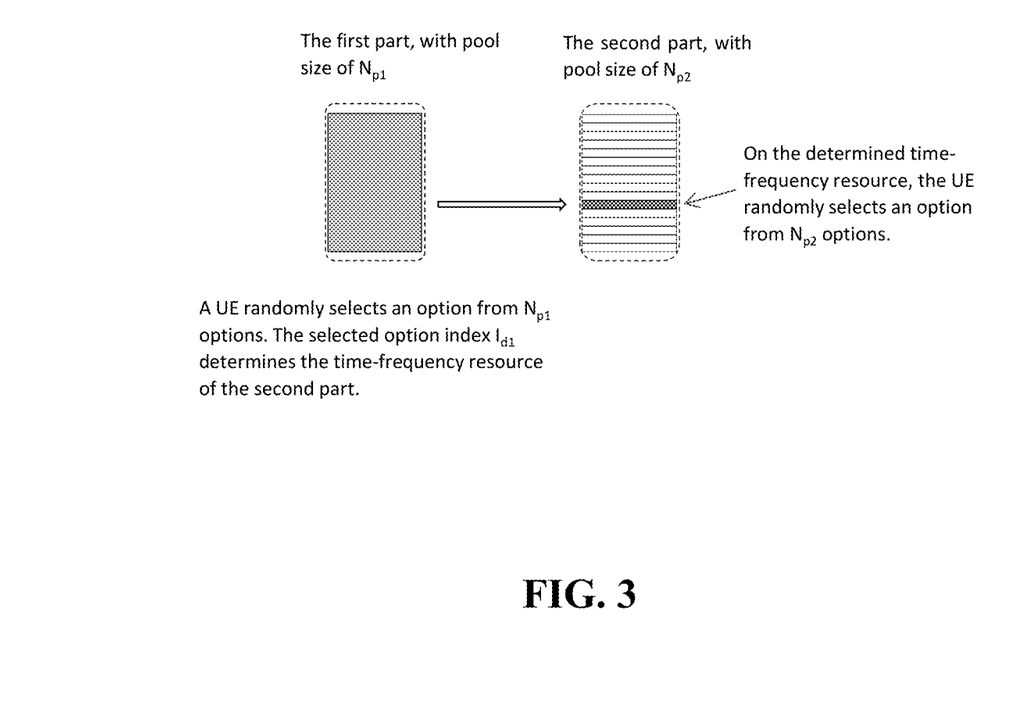
FIG. 3 shows an example of a reference signal with multiple parts.

FIG. 3 depicts a reference signal that contains two parts (e.g., two RS transmissions in FIG. 2). Two different structures may be used in the two parts, respectively. The first part provides a random selection pool size of $N_{p1}$. A UE randomly selects an option in the first pool. The index of selected option in the first pool determines the time-frequency resource of the second part. The second part provides a random selection pool size of $N_{p2}$. The UE randomly selects an option in the second pool.

In general, the time-frequency resource grid definition of the first part and the second part can be different to allow flexible configuration and resource allocation. In other words, the minimum allocation unit count of subcarriers may be different for the two (or multiple, in general) parts of the reference signal.

The reference signal structure of the first part can be a sequence set with zero/low correlation. CAZAC (Constant Amplitude Zero Auto Correlation) sequences like Zadoff-Chu sequences used in LTE is a good candidate. Pseudo-random sequence like m sequences used in IS-95 and LTE is also a possible candidate.

The reference signal structure of the second part can be a constellation set or a sequence set with zero/low correlation (e.g., rows from a Hadamard matrix), depending on the time-frequency resource size determined by the first part.

Apparently, the whole reference signal pool size is $N_p=N_{p1} \cdot N_{p2}$, where the multiplication comes from the independent selection of the first and second parts content.

The aforementioned design with two structures can be generalized to a reference signal with more than two structures. The random selected precedent reference signal determines the time-frequency resource of the following reference signals, but the content of the following reference signals are selected independently.

Example Embodiment 1

Figure 4:
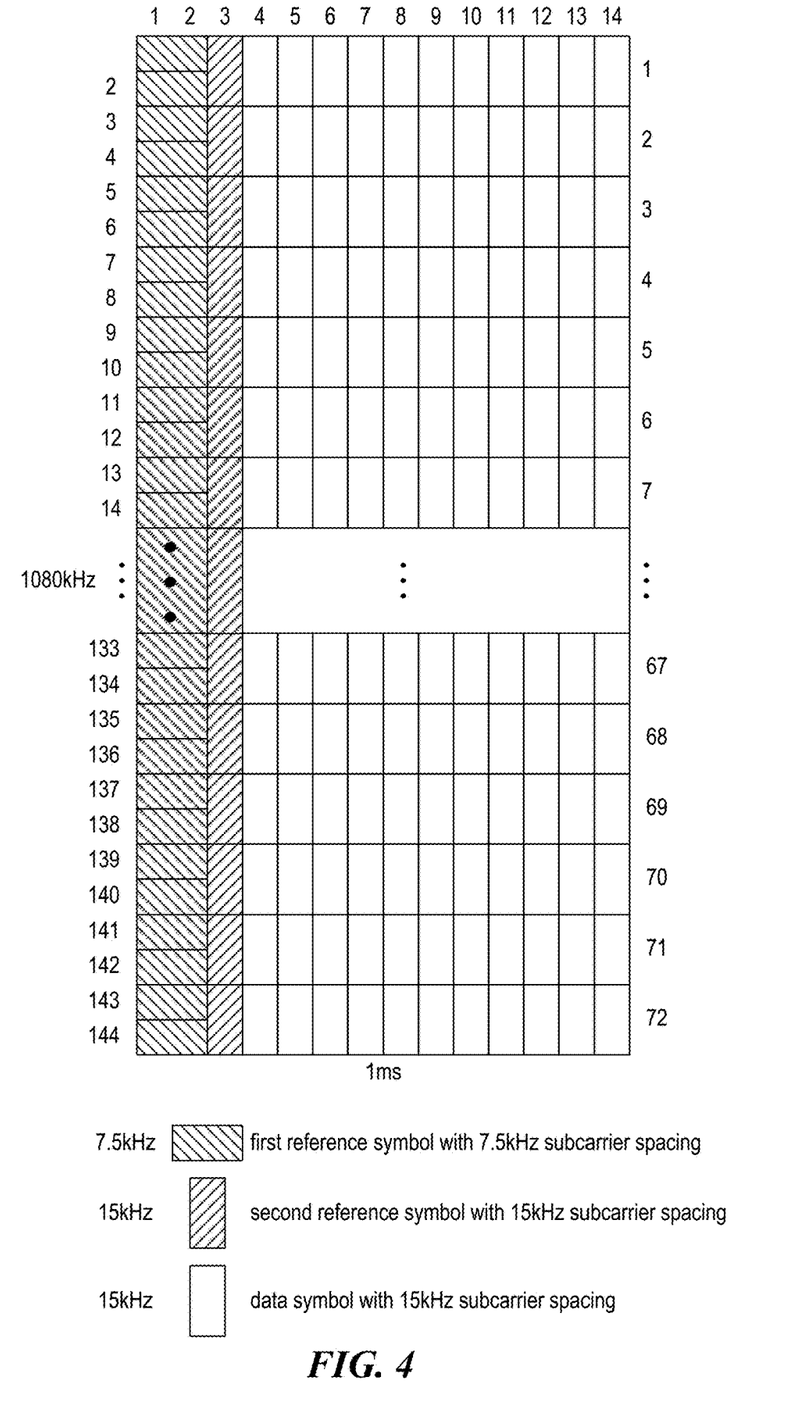
FIG. 4, FIG. 5 and FIG. 6 are resource grid depictions of various embodiments of multi-structure reference signals.

As depicted in the example of FIG. 4, a time-frequency resource of 1080 kHz*1 ms is used, where both front-loaded reference signal and data is accommodated. This structure is suitable for one-shot transmission, in which front-loaded reference signal can be used for UE detection and channel estimation.

The reference signal consists of two symbols with different structures. The first symbol uses subcarrier spacing of 7.5 kHz and the second symbol uses subcarrier spacing of 15 kHz. The data consists of 11 symbols with subcarrier spacing of 15 kHz.

In FIG. 4, the cyclic prefix of each time domain symbol is not plotted for the sake of simplicity. The first reference signal symbol occupies $1/7500 = 1.33 \cdot 10^{-4}$ second, which is two times length of the second reference signal symbol (time duration of $1/15000 = 6.67 \cdot 10^{-5}$ second). On the top of the figure below, index 1 to 14 represents the time domain symbol index for 15 kHz subcarrier spacing.

The first reference signal symbol is generated similar to a LTE SRS sequence with length of 144, which is based on a cyclic-padded Zadoff-Chu sequence with length of 139. A phase rotation sequence is generated to carry a specific cyclic shift. With 2 roots and cyclic shift resolution of $$\frac{2\pi}{36},$$

the first reference signal symbol has a pool size of $N_{p1}=2*36=72$.

If a UE chooses the $n_{p1}^{th}$ option in the first reference signal symbol, it will occupy the $n_{p1}^{th}$ subcarrier in the second reference signal symbol. The second reference signal symbol carries an option from a QPSK constellation, i.e., from $$\left\{ \frac{1}{\sqrt{2}}(1+j), \frac{1}{\sqrt{2}}(1-j), \frac{1}{\sqrt{2}}(-1+j), \frac{1}{\sqrt{2}}(-1-j) \right\}.$$

In other words, the second reference signal symbol has a pool size of $N_{p2}=4$.

In this example, the two reference signal symbols using two different structures provide a pool with $N_p=N_{p1} \cdot N_{p2}=72 \cdot 4=288$ options.

If two UEs both choose the $n_{p1}^{th}$ option in the first reference signal symbol, they will occupy the $n_{p1}^{th}$ subcarrier in the second reference signal symbol. Each of these two UEs will independently choose from the 4 options for its second reference signal symbol. If they choose different options, the receiver will obtain different channel estimation result on the first reference signal symbol and the second reference signal symbol. In this way, the receiver (e.g., the base station) can tell there is a collision and facilitate the usage of advanced receiver to resolve the collision. In summary, this reference signal with two different structured symbols provide collision detection capability. The overhead of reference signal in this example is 3/14.

Example Embodiment 2

Figure 5:
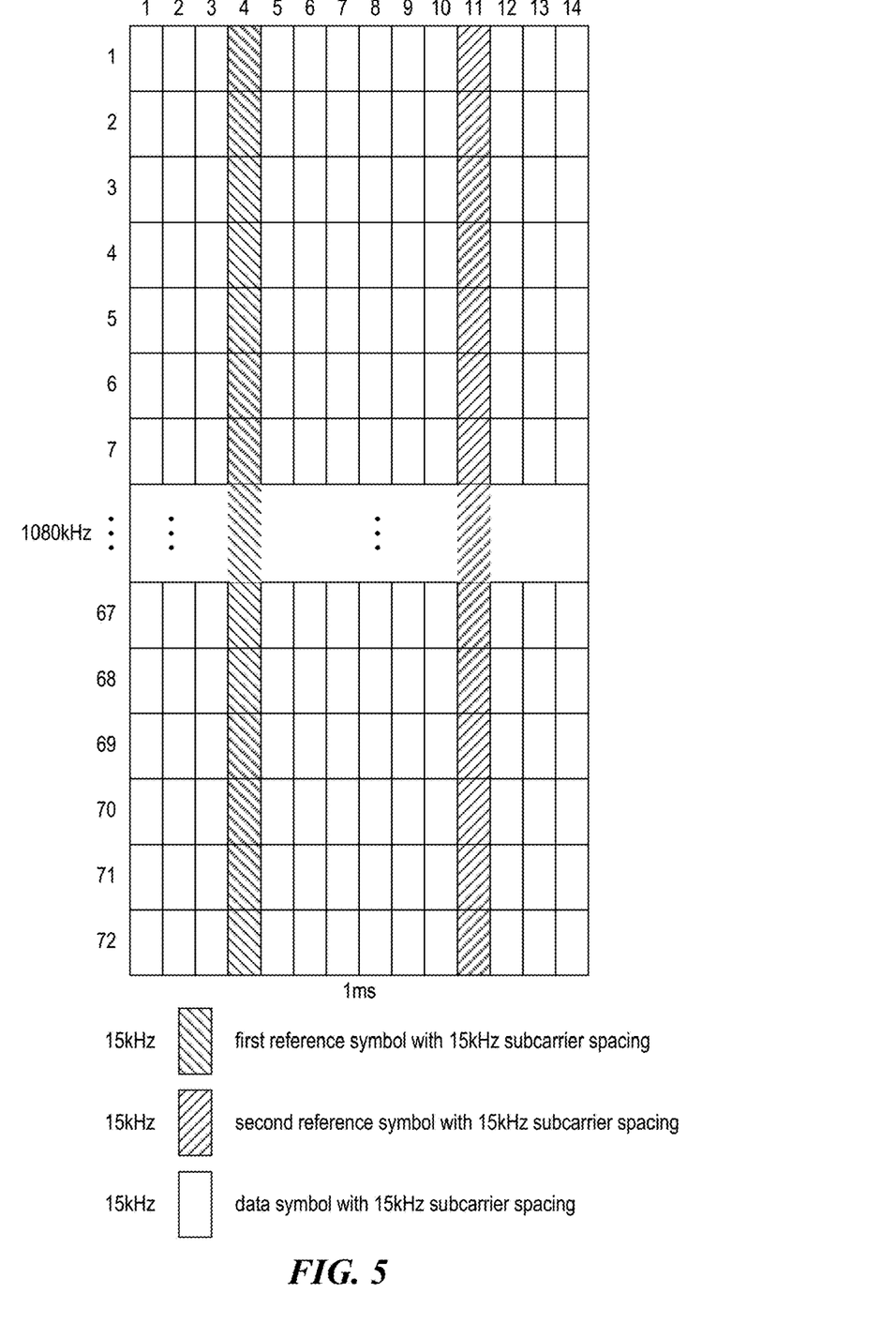

With reference to the example resource grid depicted in FIG. 5, time-frequency resource of 1080 kHz*1 ms is used, where both reference signal and data is accommodated. This structure is suitable for one-shot transmission, which is the same as that used in LTE system. The reference signal can be used for UE detection and coarse channel estimation. Refined channel estimation can be achieved using advanced receiver.

The reference signal consists of two time domain symbols as same as LTE DMRS (demodulation reference signal), but the structures of these two reference signal symbols are different.

The cyclic prefix of each time domain symbol is not plotted for the sake of simplicity. Both reference signal symbols occupy $1/15000=6.67 \cdot 10^{-5}$ second. In FIG. 5, index 1 to 14 along the horizontal axis (depicted on the top) represent the time domain symbol index for 15 kHz subcarrier spacing.

The first reference signal symbol is selected by a given UE from a pseudo-random sequences pool with 72 different sequences, each of them with length of 72.

If a UE chooses the $n_{p1}^{th}$ option in the first reference signal symbol, it will occupy the $n_{p1}^{th}$ subcarrier in the second reference signal symbol. The second reference signal symbol carries an option from a BPSK constellation, i.e., from $$\left\{ \frac{1}{\sqrt{2}}(1+j), \frac{1}{\sqrt{2}}(-1-j) \right\}.$$

In other words, the second reference signal symbol has a pool size of $N_{p2}=2$.

In this example, the two reference signal symbols using two different structures provide a pool with $N_p=N_{p1} \cdot N_{p2}=72 \cdot 2=144$ options.

If two UEs choose the $n_{p1}^{th}$ option in the first reference signal symbol, they will occupy the $n_{p1}^{th}$ subcarrier in the second reference signal symbol. Each of these two UEs will independently choose from the 2 options for its second reference signal symbol. If they choose different options, the receiver will obtain different channel estimation result on the first reference signal symbol and the second reference signal symbol. In this way, the receiver can tell there is a collision and facilitate the usage of advanced receiver to resolve the collision. In summary, this reference signal with two different structured symbols provide collision detection capability. The overhead of reference signal in this example is 2/14.

Example Embodiment 3

Figure 6:
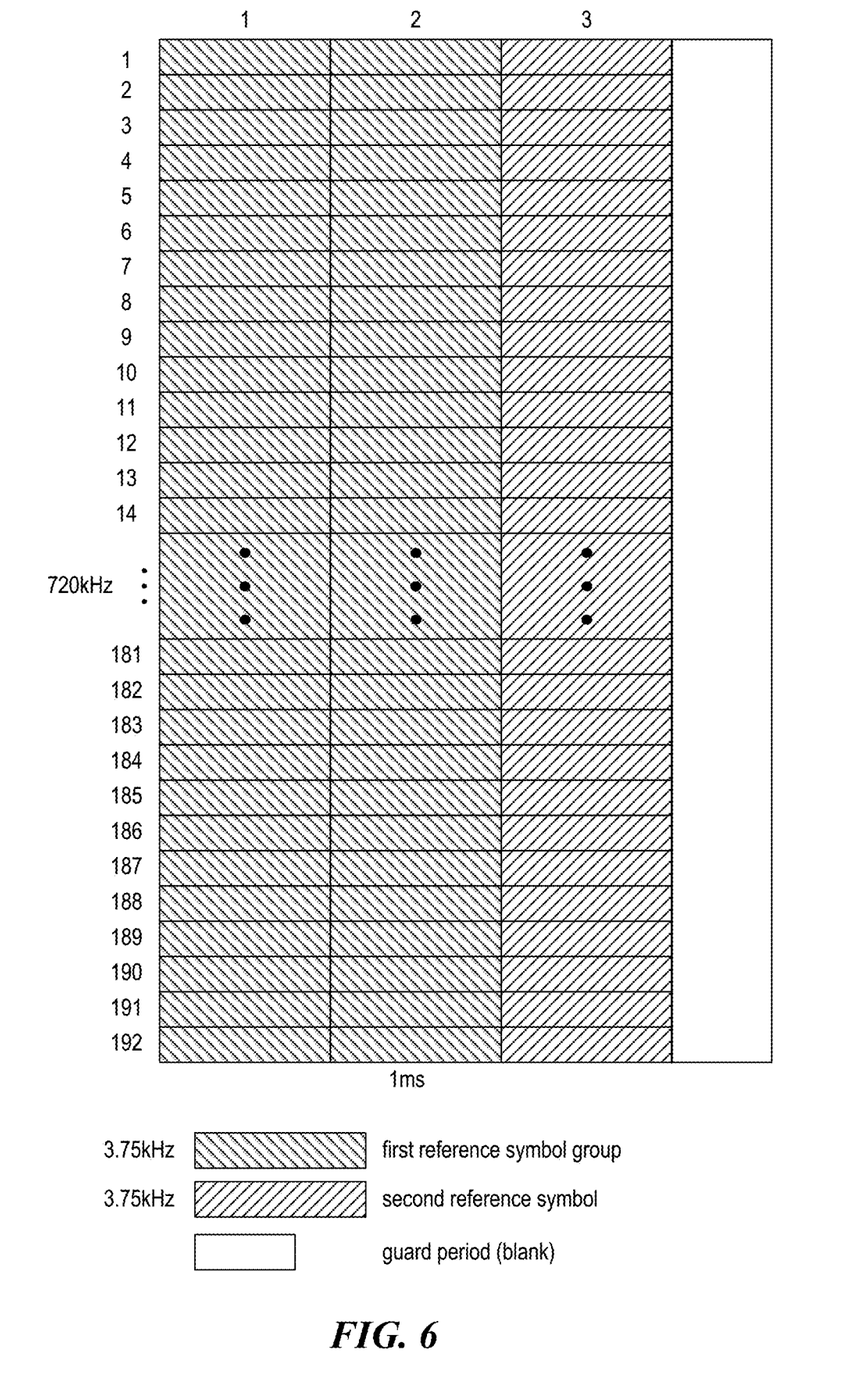

FIG. 6 is a resource grid depicting an example embodiment 3, in which time-frequency resource of 720 kHz*1 ms is used, where only reference signal is accommodated. This structure is suitable for random access in massive connection scenarios. The reference signal can be used for UE detection and measurements like time/frequency offset and so on.

The reference signal consists of three time domain symbols with 3.75 kHz subcarrier spacing. A guard period is padded at the end.

The cyclic prefix of each time domain symbol is not plotted for the sake of simplicity. Each reference signal symbols occupies $1/3750=2.67 \cdot 10^{-4}$ second. On the top of the figure below, index 1 to 3 represents the time domain symbol index for 3.75 kHz subcarrier spacing.

The first part contains two reference signal symbols (indexed 1 and 2, respectively) with the same structure. Each of them is generated similar to a LTE SRS sequence with length of 192, which is based on a cyclic-padded ZC sequence with length of 191. A phase rotation sequence is generated to carry a specific cyclic shift. With 2 roots and cyclic shift resolution of $$\frac{2\pi}{48},$$

the first part has a pool size of $N_{p1}=4*48=96$. To alleviate inter-root interference, orthogonal cover codes [+1 +1] and [+1 −1] are assigned to each root, respectively. The orthogonal code is applied to two reference signal symbols in the first part.

The second part contains one reference signal symbol (indexed 3) with a different structure (compared with symbols in the first part). If a UE chooses the $n_{p1}^{th}$ option in the first part, it will occupy the $n_{p1}^{th}$ and $(n_{p1}+96)^{th}$ subcarrier in the second part. The reference signal symbol (indexed 3) in the second part carries an option from a QPSK constellation, i.e., from $$\left\{\frac{1}{\sqrt{2}}(1+j), \frac{1}{\sqrt{2}}(1-j), \frac{1}{\sqrt{2}}(-1+j), \frac{1}{\sqrt{2}}(-1-j)\right\}.$$

In other words, the second part has a pool size of $N_{p2}=4$.

In this example, the reference signal using two different structures on three reference signal symbols provide a pool with $N_p = N_{p1} \cdot N_{p2} = 96 \cdot 4 = 384$ options.

If two UEs choose the $n_{p1}^{th}$ option in the first part, they will occupy the $n_{p1}^{th}$ and $(n_{p1}+96)^{th}$ subcarriers in the second part. The interval of 96·3.75=360 kHz between two subcarriers brings potential diversity gain. Each of these two UEs will independently choose from the 4 options for its second part. Each of these two UEs put their selected options on $n_{p1}^{th}$ and $(n_{p1}+96)^{th}$ subcarriers in the reference signal symbol indexed 3. If they choose different options, the receiver will obtain different channel estimation result on the first part and the second part. In this way, the receiver can tell there is a collision and facilitate the usage of advanced receiver to resolve the collision. In summary, two different structured reference signal symbols provide collision detection capability.

Various embodiments that use the multi-structure reference signals may include the following features: (1) More than one different reference signal structures are used in reference signal. (2) The random selected first reference signal determines the time-frequency resource of the following reference signals, but the content of the following reference signals are selected independently. For example, three (or more) different reference signal structures may be used. A UE randomly chooses an option in the first reference signal, then the time-frequency resource of the second and the third reference signals is determined. The content of the second and the third reference signals is randomly chosen by the UE in corresponding pools. (3) The random selected precedent reference signal determines the time-frequency resource of the following reference signals, but the content of the following reference signals are selected independently. For example, three different reference signal structures are used. A UE randomly chooses an option in the first reference signal, then the time-frequency resource of the second reference signal is determined. Next, the content of the second reference signal is randomly chosen by the UE in the second pool, which determines the time-frequency resource of the third reference signal. At last, the content of the third reference signal is randomly chosen by the UE in the third pool.

Taking two different structures combination as an example, embodiments may advantageously benefit due to the following aspects: (1) The overall random selection pool size is determined by multiplication of pool size 1 and pool size 2, where pool size 1 and pool size 2 correspond to the first reference signal and the second reference signal, respectively. The multiplication means an effective extension of pool, which significantly alleviates the collision. (2) The second reference signal provides collision detection capability with its degree of freedom. Without collision detection, the advanced receiver has to blindly try SIC on all reference signals, which means prohibitive complexity. With collision detection, the advanced receiver can carry out SIC on collided reference signals, which is more friendly to implementation.

As further described throughout this document, some embodiments may coordinate the mapping rule that maps the resource utilization and pool selection between the first and the second reference signal (or additional subsequent reference signals, if there are more than two). In some embodiments, it may be advantageous for a base station to indicate the mapping rule to the UEs. For example, the base station may indicate which reference signal format is used in current cell via a system-wide broadcast message such as the system information block (SIB). From this indication, UEs know the detailed structures of multiple reference signals, the pool size of each reference signal, the mapping rule from precedent reference signal to following reference signal.

In some embodiments, first, a BS may indicate which reference signal format is used in current cell via system information block. After receiving this message, UEs in this cell randomly select their own first reference signal (e.g., from 72 options as in Example Embodiment 1) and second reference signal (from 4 options as in Example Embodiment 1). The mapping rule from the BS enables both the receiving side and the transmitting side to logically connect the first reference signal and the second reference signal. For example, the mapping rule may be that the content of the first reference signal determines the time-frequency resource of the second reference signal.

In general, embodiments may use reference signal pols that are include non-overlapping entries and are independent of each other.

For UEs to use the above-described multi-structure reference signal transmissions for random access (RACH) transmissions, the BS may need to inform UEs current used RACH format with control signaling. Generally, there are several RACH signal formats available. For example, in 5G New Radio (NR), there are 2 RACH sequence with length 139 or 839. The BS may inform UE which RACH format is used in current cell (field named: prach-RootSequenceIndex). And the UE should use this RACH format to generate its RACH signal. In general, there may be several RACH formats like Example Embodiment 1 and Example Embodiment 2. Then BS should inform UEs whether RACH format in Example 1 or 2 (or another RACH format) should be used in current cell. For example, the BS may transmit SIB on PDSCH (physical downlink shared channel) to inform UEs the RACH format in current cell. And in this SIB, detailed RACH configuration is indicated, including structures, time-frequency resource mapping rule from precedent reference signal to following reference signal.

Revisiting Example Embodiment 1, the pool size of the first reference signal is 2 roots*36 cyclic shifts=72 options. UE randomly selects a root and a cyclic shift, e.g., one option from these 72 options. Then the UE can generate its first reference signal. According to its selection, the time-freq resource of the second reference signal is determined In Example Embodiment 1, a very simple mapping rule is given: the index of selected option in pool 1 equals the subcarrier index of the second reference signal. Thus, the content of the first reference signal determines the time-freq resource of the second reference signal. But the content of the second reference signal is independent to the first reference signal. The first and the second reference signals may then be transmitted in a pre-determined temporal order. For example, in some embodiments, the second reference signal may be transmitted earlier in time than the first reference signal, and vice versa.

Figure 7:
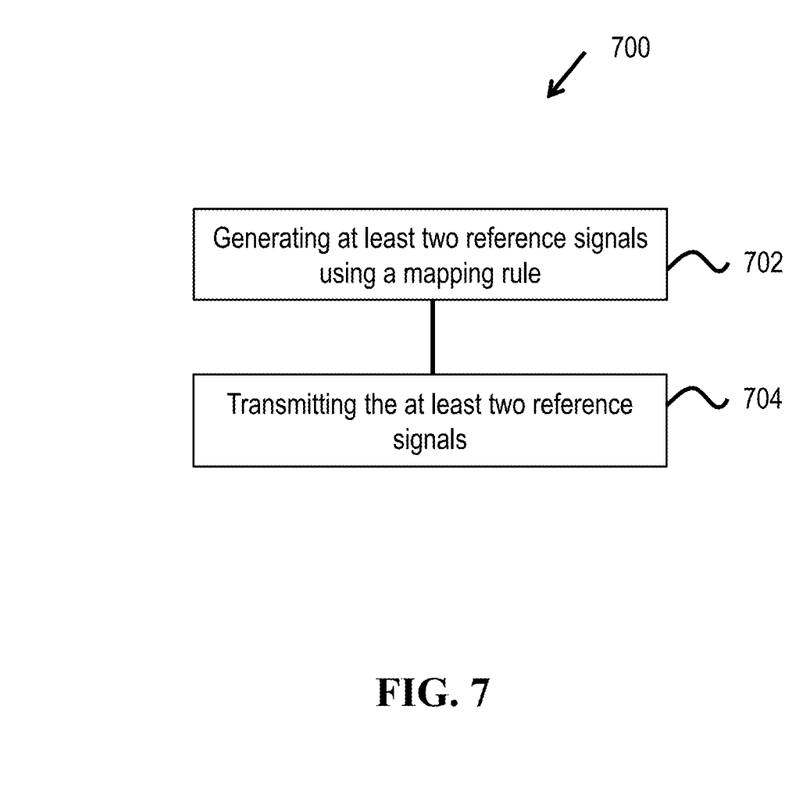
FIG. 7 is a flowchart of an example wireless communication method.

FIG. 7 shows a flowchart for an example method 700 of wireless communications. The method 700 includes generating (702), based on a mapping rule, at least two reference signals, and transmitting (704), by a wireless communication device, the at least two reference signals using different symbols in a transmit (transmission) time interval (TTI). The TTI may correspond to a frame of transmission that is a unit of transmission over which certain link measurements, such as bit error rate, may be performed. The TTI may also simply be a unit of time comprising multiple symbols (or time slots) that is used to schedule various transmissions.

Figure 8:
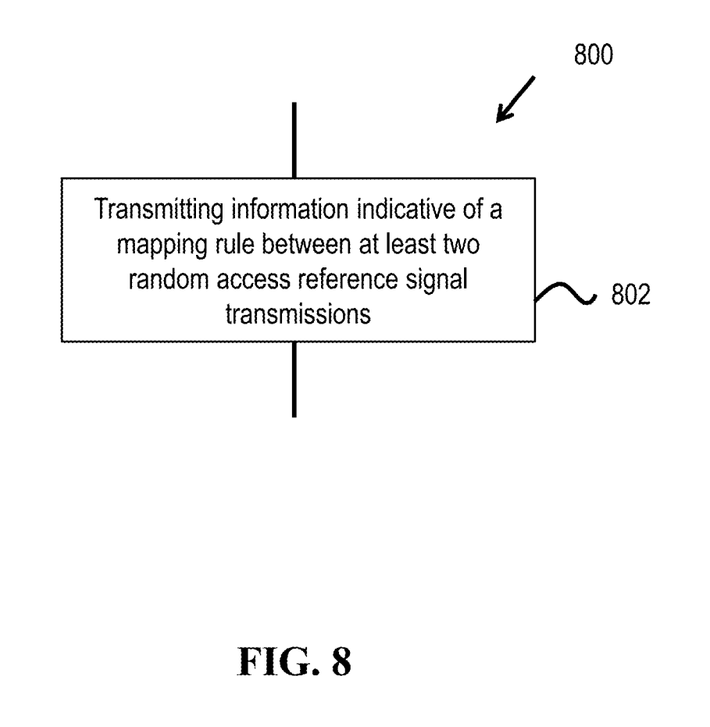
FIG. 8 is a flowchart of an example of another wireless communication method.

FIG. 8 is a flowchart of an example of another wireless communication method 800. The method 800 includes transmitting (802), to one or more wireless devices in a wireless network, information indicative of a mapping rule that specifies a mapping between at least two reference signal transmissions from the one or more wireless devices. In some embodiments, the reference signal transmissions may be random access transmissions.

In some embodiments, the mapping rule may be received by the wireless communication device from a network node (e.g., a base station). Alternatively, the mapping rule may be known a priori to the wireless communication device.

In some embodiments, the generating includes generating a first reference signal of the at least two reference signals includes selecting the first reference signal from a first pool of reference signals.

In some embodiments, the generating includes generating a second reference signal by selecting the second reference signal from a second pool of reference signals. In some embodiments, the first pool of reference signals and the second pool of reference signals have different pool sizes. In some embodiments, the first reference signal may be transmitted before the second reference signal. In general, the order in which reference signals are selected by the communication device, and the temporal order in which they are transmitted need not be the same. In some embodiments, the reference signals may include a reference signal based on a translational self-orthogonal sequence such as a Zadoff-Chu sequence. In some embodiments, one of the reference signals may be a binary phase shift keying. In some embodiments, one of the reference signals may be a phase shift keying signal. In some embodiments, one of the reference signals may be a quadrature amplitude modulation signal.

In some embodiments of the method 800, the mapping rule specifies different and multiple structures for random access reference signals transmissions of the at least two random access reference signal transmissions. The method 800 may further include receiving, from a given wireless device, corresponding at least two random access reference signal transmissions, and providing, conditionally based on successful decoding of the at least two random access reference signal transmissions, random access to the given wireless device to the wireless network. For example, the random access may be provided only when the receiver (e.g., the base station) is able to successfully receive and decode the signals.

In some embodiments, the mapping rule may be carried in a broadcast message. One example of such as message is the System Information Block (SIB).

In methods 700 and 800, in some embodiments, the mapping rule specifies a relationship between an identify of a first reference signal and time-frequency resources used for transmission of a second reference signal. In some embodiments, the mapping rule specifies a relationship between content of the first reference signal and transmission resources used for transmitting the second reference signal.

In some embodiments, the at least two reference signals comprise N reference signals, where N is an integer greater than 1, and wherein the mapping rule specifies determining structures of the N reference signals in parallel. For example, the content and/or the time-frequency resources used by the reference signal transmissions may be determinable on their own. For example, in some embodiments, there may be N reference signals specified by the mapping rule, where N is an integer that is at least 2 or more. The mapping rule specifies determining structures of the N reference signals in a sequence. The sequence may be such that content or time/frequency resources used for transmission of a next reference signal may be determined from content or time/frequency resource used for transmission of one or more previous reference signals. For example, in the case of three reference signals (RS1, RS2 and RS3), the user device may first determine structure of RS1 (e.g., content and/or time-frequency resources used), followed by structure of RS2 (from structure of RS1) followed by structure of RS3 (from structure of RS1 and/or RS2). Furthermore, RS1, RS2, and RS3 may be transmitted in a different temporal sequence (e.g., RS3, followed by RS2 followed by RS1).

Figure 9:
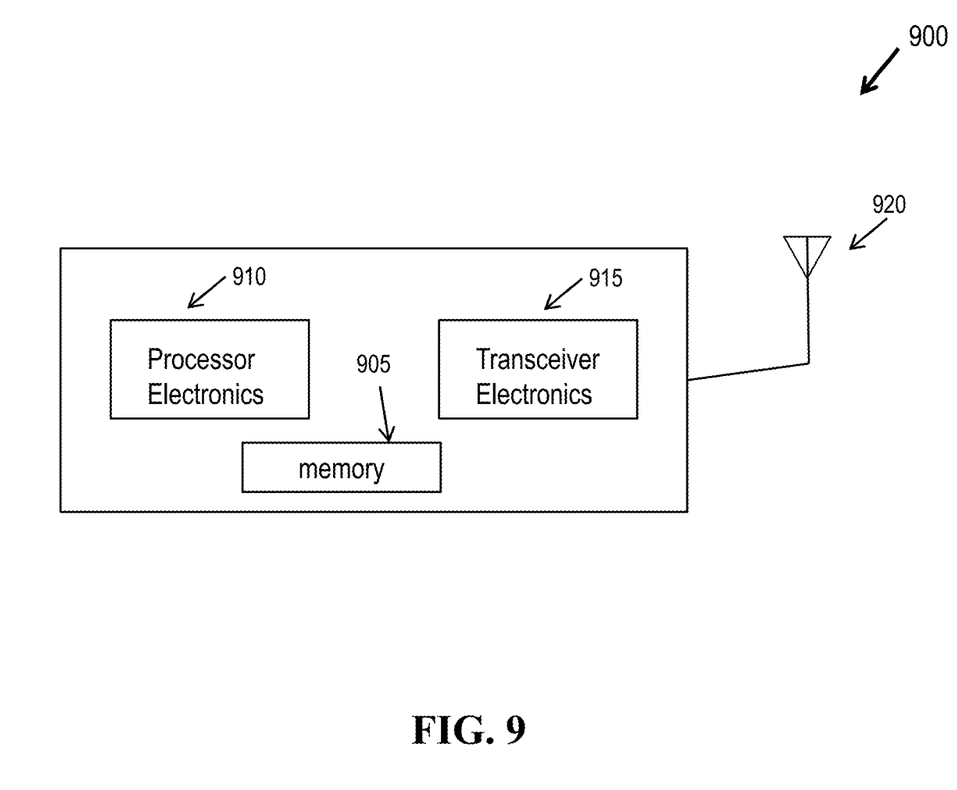
FIG. 9 is a block diagram of an example of a wireless communication apparatus.

FIG. 9 is a block diagram of an example of a wireless communication apparatus 900. The apparatus 900 includes a processor 910 that may be configured to implement one of the techniques described herein, transceiver electronics 915 that is able to transmit signals or receive signals using the antenna(s) 920, and one or more memories 905 that may be used to store instructions executable by the processor 910 and/or data storage.

Figure 10:
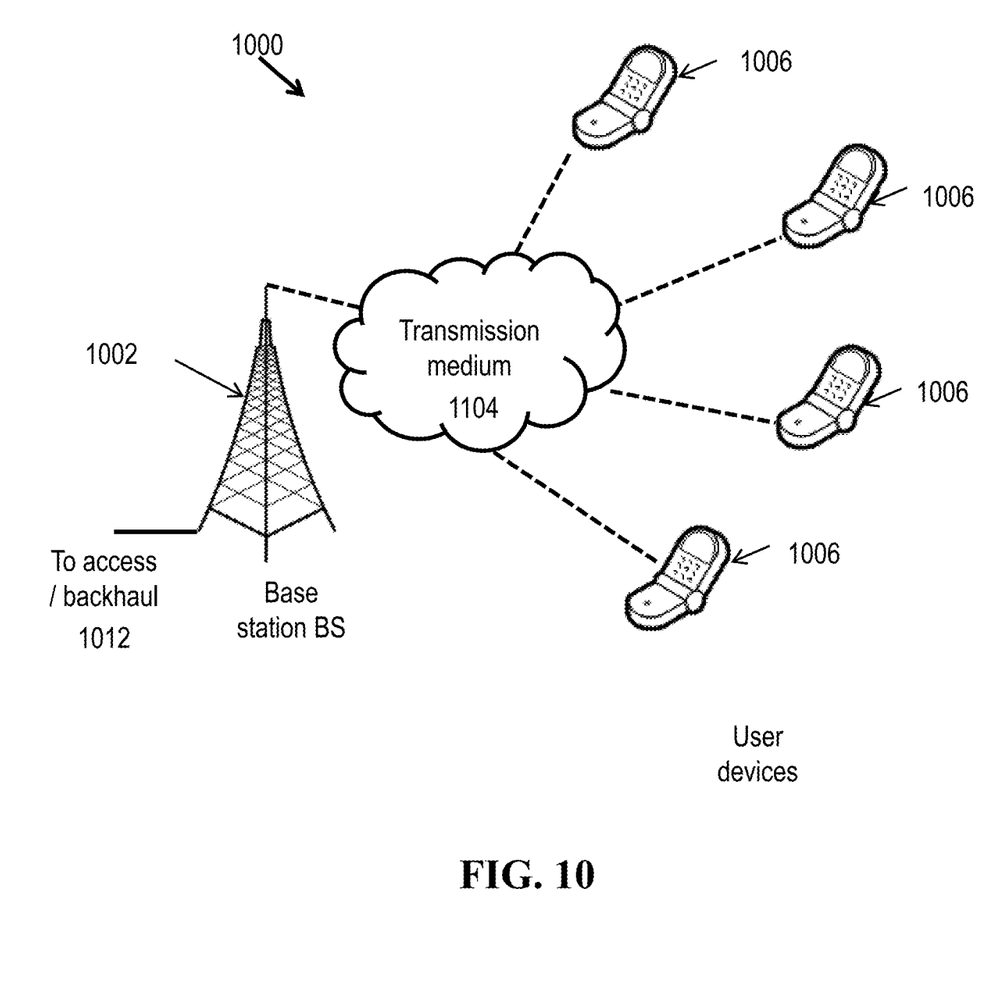
FIG. 10 shows an example wireless communications network.

FIG. 10 shows an example wireless communications network 1000. The network 1000 includes a base station BS 1002 and multiple user devices 1006 being able to communicate with each other over a transmission medium 1004. The transmissions from the BS 1002 to the devices 1006 are generally called downlink or downstream transmissions. The transmissions from the devices 1006 to the BS 1002 are generally called uplink or upstream transmissions. The transmission medium 1004 typically is wireless (air) medium. The BS 1002 may also be communicatively coupled with other base stations or other equipment in the network via a backhaul or an access network connection 1012.

It will be appreciated that the present document discloses techniques for using multi-structure reference signals that benefit the operation of a wireless network by reducing probability of transmission collisions among UEs transmitting during random access. Multiple reference signals may be transmitted by a UE such that each reference signal from the multiple reference signal is independently selected from a pool of possible candidates. The time-frequency resources used by a subsequent reference signal may depend on the reference signal content of an earlier reference signal.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
   generating, based on a mapping rule, at least two reference signals; and transmitting, by a wireless communication device, the at least two reference signals using different symbols in a transmit time interval, wherein the at least two reference signals include a first reference signal and a second reference signal, wherein the first reference signal is selected from a first pool of reference signals, wherein the first reference signal is transmitted at a first time that is temporally prior to or after a second time at which the second reference signal is transmitted.

2. The method of claim 1, wherein the mapping rule is received by the wireless communication device from a network node.

3. The method of claim 1, wherein the second reference signal is selected from a second pool of reference signals.

4. The method of claim 3, wherein the first pool of reference signals and the second pool of reference signals have different pool sizes.

5. The method of claim 1, wherein the mapping rule specifies a relationship between an identity of the first reference signal and time-frequency resources used for transmission of the second reference signal.

6. The method of claim 5, wherein the identity of the first reference includes an index of the first reference signal from the first pool of reference signals.

7. The method of claim 1, wherein the mapping rule specifies a relationship between content of the first reference signal and transmission resources used for transmitting the second reference signal.

8. The method of claim 1, wherein the at least two reference signals comprise N reference signals, where N is an integer greater than 1, and wherein the mapping rule specifies determining structures of the N reference signals in parallel.

9. The method of claim 1, wherein the at least two reference signals comprise N reference signals, where N is an integer greater than 1, and wherein the mapping rule specifies determining structures of the N reference signals in a sequence.

10. The method of claim 9, wherein the mapping rule specifies determining structure of a given reference signal from one or more preceding reference signals in the sequence.

11. The method of claim 1, wherein the reference signals comprise a translational self-orthogonal sequence, a binary phase shift keying signal, a phase shift keying (PSK) signal, or a quadrature amplitude modulation (QAM) signal.

12. The method of claim 1, wherein the first reference signal is randomly selected, and wherein the mapping rule maps the first reference signal to the second reference signal such that a content of the first reference signal is used to determine a time-frequency resource of the second reference signal and a content of the second reference signal is independent to the first reference signal.

13. A wireless communication apparatus comprising a processor configured to implement a method, comprising:

generating, based on a mapping rule, at least two reference signals; and transmitting, by a wireless communication device, the at least two reference signals using different symbols in a transmit time interval, wherein the at least two reference signals include a first reference signal and a second reference signal, wherein the first reference signal is selected from a first pool of reference signals, wherein the first reference signal is transmitted at a first time that is temporally prior to or after a second time at which the second reference signal is transmitted.

14. The wireless communication apparatus of claim 13, wherein the mapping rule is received by the wireless communication device from a network node.

15. The wireless communication apparatus of claim 13, wherein the second reference signal is selected from a second pool of reference signals.

16. The wireless communication apparatus of claim 15, wherein the first pool of reference signals and the second pool of reference signals have different pool sizes.

17. The wireless communication apparatus of claim 13, wherein the mapping rule specifies at least one of a relationship between an identity of the first reference signal and time-frequency resources used for transmission of the second reference signal or a relationship between content of the first reference signal and transmission resources used for transmitting the second reference signal.

18. A non-transitory computer readable medium having code stored thereon, the code, when executed by a processor, causing the processor to implement a method, comprising:

generating, based on a mapping rule, at least two reference signals; and transmitting, by a wireless communication device, the at least two reference signals using different symbols in a transmit time interval, wherein the at least two reference signals include a first reference signal and a second reference signal, wherein the first reference signal is selected from a first pool of reference signals, wherein the first reference signal is transmitted at a first time that is temporally prior to or after a second time at which the second reference signal is transmitted.

19. The non-transitory computer readable medium of claim 18, wherein the generating includes generating the second reference signal by selecting the second reference signal from a second pool of reference signals.

20. The non-transitory computer readable medium of claim 18, wherein the at least two reference signals comprise N reference signals, where N is an integer greater than 1, and wherein the mapping rule specifies determining structures of the N reference signals in a sequence.

* * * * *